United States Patent [19]

Nowotny

[11] Patent Number: 5,385,231
[45] Date of Patent: Jan. 31, 1995

[54] PACKAGE FOR COMPACT DISK

[75] Inventor: Robert C. Nowotny, Calhoun, Ga.

[73] Assignee: Don Evans, Inc., DeForest, Wis.

[21] Appl. No.: 200,112

[22] Filed: Feb. 22, 1994

[51] Int. Cl.6 .................... B65D 17/50; B65D 85/57
[52] U.S. Cl. ................................... 206/309; 206/807
[58] Field of Search .............. 206/807, 1.5, 309, 310

[56] References Cited

U.S. PATENT DOCUMENTS

| D. 318,368 | 7/1991 | Evans | D3/3.5 |
| 4,623,062 | 11/1986 | Chase et al. | 206/807 |
| 5,285,918 | 2/1994 | Welshburn et al. | 206/807 |
| 5,305,873 | 4/1994 | Joyce | 206/807 |

FOREIGN PATENT DOCUMENTS

| 573401 | 12/1993 | European Pat. Off. | 206/807 |
| 2673912 | 9/1992 | France | 206/807 |
| 3110749 | 1/1982 | Germany | 206/807 |

Primary Examiner—William I. Price
Attorney, Agent, or Firm—Quarles & Brady

[57] ABSTRACT

A jewel case for compact disks has a hinged lid and base held in the closed position by both a breakable tab extending from the base though a mortise in the lid and by a dimple and protrusion forming a detent. Initial opening of the jewel box requires a sufficient force to break the tab. Later openings require less force sufficient only to release the detent. The hinge is formed of pins received in sockets, the pins and sockets being disengageable only when the lid and base are in the open position. The tabs have camming surfaces to permit them to engage the mortise in the lid by deflecting sidewalls of the lid apart.

7 Claims, 2 Drawing Sheets

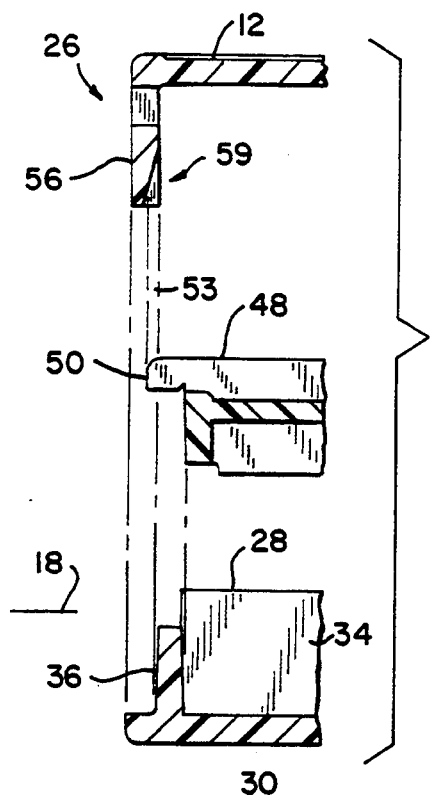
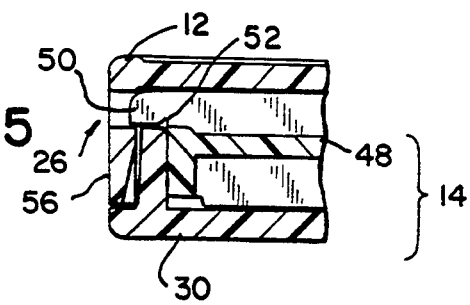
FIG. 5
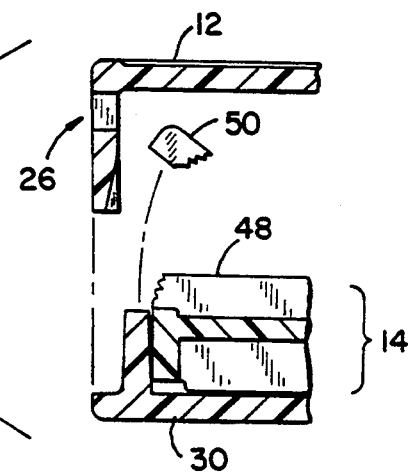
FIG. 6
FIG. 4
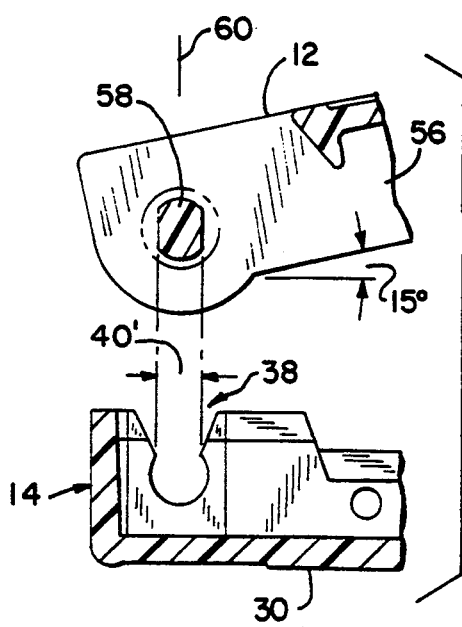
FIG. 7
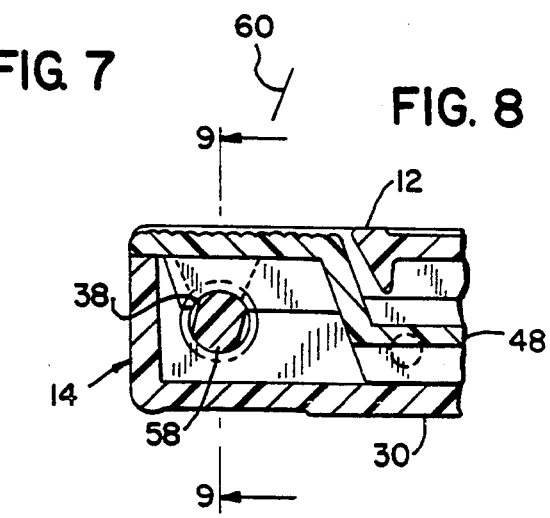
FIG. 8
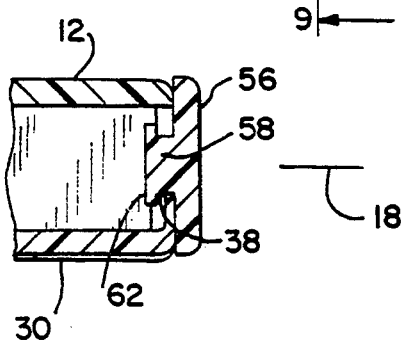
FIG. 9

PACKAGE FOR COMPACT DISK

FIELD OF THE INVENTION

The present invention relates to a package suitable for both the distribution of compact disks and for the subsequent storage of the compact disks by the consumer. More particularly, the present invention relates to a package for compact disks providing two levels of resistance to opening.

BACKGROUND OF THE INVENTION

Compact disks ("CDs") have largely replaced the phonograph record as the medium of choice for sound recording. The smaller size, higher fidelity, and substantially unlimited life of the CD provide clear benefit over the phonographic recording.

The small size of the CD, however, also creates a problem for retailers because a CD is more easily stolen from stores than is a larger phonograph record.

This problem of theft was originally addressed by the addition of a cardboard overpackage which increased the bulk of the CD at the retail level but could be removed by the consumer to reveal a smaller CD "jewel box" suitable for storing the CD in between playings. The perceived wastefulness of discarding the bulky overpackage has caused manufacturers to eliminate the overpackage and to sell the CDs packaged simply in their jewel boxes. In these cases, retailers use magnetic tags or other electronic alarm devices attached to the CD jewel boxes to prevent shoplifting. Unfortunately, such alarm systems may be circumvented by simply opening the CD jewel box and slipping the CD out of the jewel box.

An additional problem with CDs arises from the extremely high fidelity of the recording on a CD which allows the creation of high fidelity copies. To eliminate the possibility of a customer buying the CD for copying and then returning the CD, some stores have a policy that CDs cannot be returned if the CD has been used. Determining whether the CD has been used may be difficult.

SUMMARY OF THE INVENTION

The present invention provides a CD jewel box that may serve as a package for distribution of the CD, resisting accidental or surreptitious opening of the CD jewel box prior to use by the consumer, and that permits the CD jewel box to be used for storage of the CD after it has been opened.

Specifically, the jewel box of the present invention has a base with a recess for receiving the compact disk and a lid for fitting over the base in a closed position to enclose the compact disk between the base and lid. A hinge joins the base and lid to permit the lid to swing away from the base in an open position to remove the compact disk for playing. A detent operating between the base and lid holds the base and lid in the closed position against the application of a first opening force and a catch operating between the base and lid retains the lid and base in a closed position against the application of a second opening for substantially greater than the first opening force.

It is thus one object of the invention to provide a CD jewel box that requires significant force to open for the first time thus preventing theft or loss of the CD but that thereafter can be opened with a lesser force for routine use by the consumer. The lesser force is still high enough to permit the CD jewel box to be positively closed for the protection of the CD in storage.

The catch may be a tab protruding from either the lid or base to be received in a mortise in the other whereby the tab is adapted to break off upon the first opening of the lid and base. The lid may be constructed of a transparent material and the tab of contrasting material whereby the presence or absence of the tab may be detected visually when the lid and base are in the closed position.

Thus it is another object of the invention to provide a visual indication that the CD jewel box has been opened.

The hinge may include a pin protruding from either the lid or base to be received in a socket in the other so that the pin may swivel about a hinge axis in the socket with the opening and closing of the lid and base. The socket is open along one side to receive and release the pin along an insertion direction perpendicular to the hinge axis and the width of the pins across the hinge axis is varied so that the pin may be received and released only when the lid and base are in the open position. The pins are terminated by a flange that prevents removal of the pins from the sockets with motion of the pins along the hinge axis.

Thus, it is another object of the invention to permit ready assembly of the lid and base by the snapping together of the pins and sockets of the hinge in an open position, while preventing the hinge from being disengaged after it has been assembled and the lid and base closed and thus preventing circumventing the operation of the catch. Because the hinge pins and sockets may only be assembled in the open position when the CD jewel box is closed, the integrity of the hinge is insured.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 4 is a front elevational, cross-section in detail taken along line 4—4 of FIG. 2 showing a ramping surface on the lid for permitting initial closure of the lid over the tab of the tray;

FIG. 5 is a figure similar to that of FIG. 4 showing the tray of the base and the lid in closed and locked position;

FIG. 6 is a view similar to that of FIGS. 4 and 5 showing the breaking off of the tab of FIGS. 2 and 3 upon first opening of the lid from the base;

FIG. 7 is a figure similar to that of FIG. 2 showing the necessary rotation of the lid with respect to the base for the insertion of the hinge pins into their sockets in the base;

FIG. 8 is a figure similar to FIG. 7 showing the lid and base assembled and closed and showing the relationship of the hinge pin to the socket preventing removal of the hinge pin from the socket;

FIG. 9 is a cross-sectional, detail view of the hinge pin and socket of FIG. 8 showing the flange on the hinge pin preventing removal of the hinge pins along the pin axes.

DETAILED DESCRIPTION OF THE PREFERRED EMBODIMENT

Figure 1:
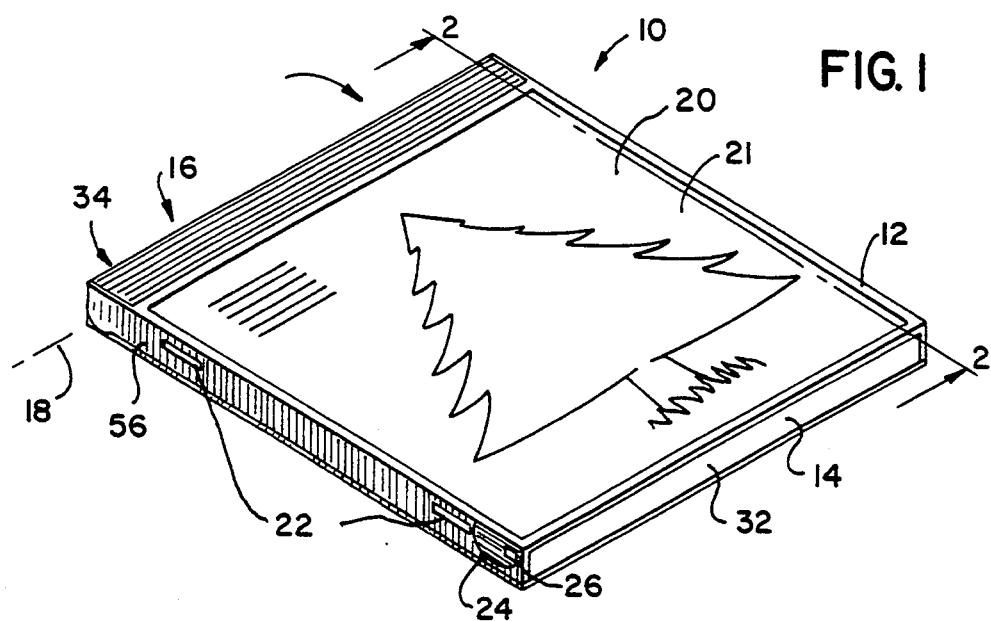
FIG. 1 is a perspective view of a CD jewel box per the present invention showing the lid and base assembled together and showing a rectangular mortise in the lid for receiving a tab which locks the two together against hinging.

Referring to FIG. 1, a CD jewel box 10 includes a transparent lid 12 connected to a base 14 by means of a hinge 16 which permits the lid to swing about a hinge axis 18 to open and close over the base 14. The lid 12 and base 14 are constructed of a transparent plastic material such as polystyrene.

Figure 2:
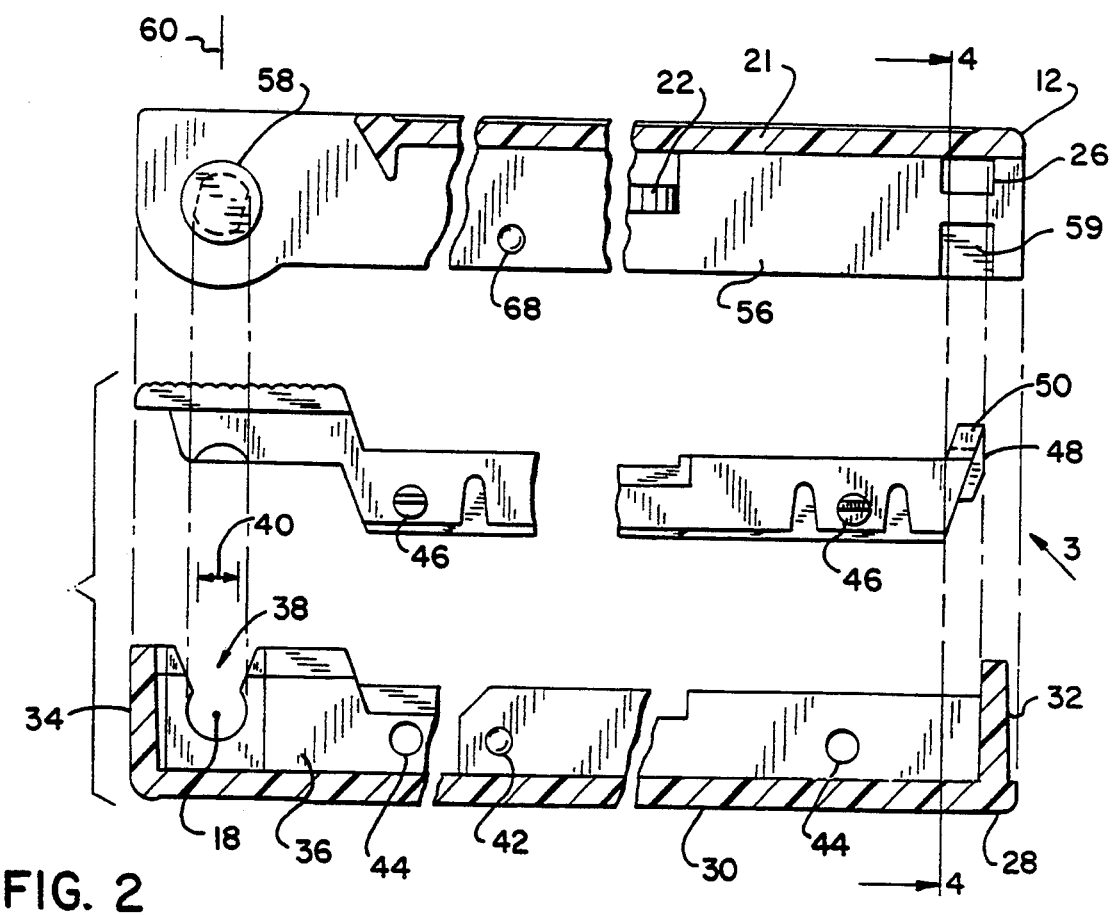
FIG. 2 is a fragmentary, exploded, side elevation of the jewel box in cross-section taken along line 2—2 of FIG. 1, showing the lid and base, together with a tray forming part of the base for holding the CD and having the tab for fitting into the mortise of FIG. 1.

Referring also to FIG. 2, the lid 12 includes a rectangular top panel 21 rimmed by downwardly extending walls including left and right sidewalls 56. Positioned beneath the lid 12 and visible therethrough are program notes 20 held by fingers 22 projecting inward from the edges of the lid 12. The program notes are generally visible through the top panel 21 of the lid 12.

The front edge of the sidewalls 56, removed from the hinge 16, includes embossments 24 which may be gripped by fingers of the user for opening the lid 12. Positioned within the embossments 24 is a rectangular mortise 26 as will be described in more detail below.

Referring still to FIG. 2, the base 14 includes a bottom 28 having a rectangular bottom panel 30 generally circumscribing a circle of diameter equal to that of a compact disk. Bottom panel 30 is rimmed by upwardly extending walls including: a front wall 32, a rear wall 34 and left and right sidewalls 36.

Positioned on the sidewalls 36 near the rear wall 34 are sockets 38 being holes through the sidewalls 36 along the hinge axis 18, with the upper periphery of the hole removed to provide a passage vertically through the sidewall 36. The vertical passage has a minimum width 40 defined by the separation of the edges of the broken circumference of the socket 38.

Sidewalls 36 also include outwardly facing dimples 42 which serve as part of a detent holding the lid 12 closed against the base 14 as will be described in more detail below.

Holes 44 pass through the sidewalls 36 to provide a purchase for corresponding bosses 46 of an opaque tray 48 nesting as an insert into the bottom 28 with the bosses 46 snapping into holes 44 and holding the tray 48 into the bottom 28. The lower surfaces of the bosses 46 are beveled so as to deflect the sidewalls 36 of the bottom 28 outward to facilitate the nesting of the tray 48 into the bottom 28 with bosses 46 engaged with holes 44. The upper surfaces of the bosses 46 are substantially parallel to the walls of holes 44 thereby locking the tray 48 into the bottom 28.

The tray 48 conforms substantially to the inner dimensions of the bottom 28 and provides a circular recess for receiving and holding a compact disk (not shown) therein. The construction of the base 14 from two parts: the tray 48 and bottom 28, facilitates the manufacture of the tray 48 and bottom 28 by injection molding.

Figure 3:
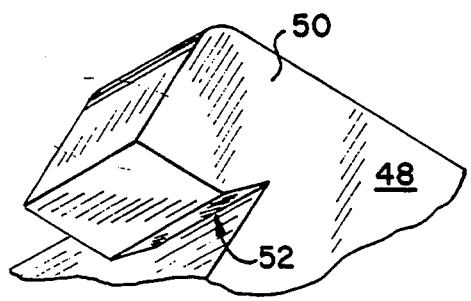
FIG. 3 is a detailed perspective view of the tab of FIG. 2 along arrow 3 in FIG. 2.

Referring also to FIGS. 3 and 4, tray 48 includes a tab 50 extending along an axis generally parallel to the hinge axis from the front to the tray 48 so that when the tray 48 is received within bottom 28, tabs 50 extend on top of sidewalls 36 and past sidewalls 36 by an engagement distance 53. When the lid 12 is in place over the base 14, each tab 50 is received within the mortise 26 cut in a sidewall 56 of the lid 12, the sidewalls 56 fitting adjacent to and outside of the sidewalls 36 on either side of the base 14.

The upper surface of the tab 50 is rounded to provide a camming surface to deflect outward the sidewalls 56 of the lid 12 when the lid 12 is closed. In the inner walls of sidewalls 56 beneath the mortise 26 is formed a ramp 59 providing a surface which extends from the inner edge of sidewall 56 toward to the outer face of sidewall 56 as the ramp progresses from a point proximate to the mortise 26 to the lowermost edge of sidewall 56. When the lid 12 is closed over the base 14, the ramp 59 also serves to flex the sidewall 56 outward to permit engaging of the tab 50 within mortise 26.

Referring now to FIG. 5, when the lid 12 is in place over the base 14, the mortise 26 aligns with the tab 50 allowing the sidewall 56 to flex back inward so that mortise 26 and tab 50 are fully engaged.

Referring now to FIGS. 3 and 6, after mortise 26 and tab 50 are fully engaged, if lid 12 is to be removed from base 14, tab 50 must flex upward. The bottom surface of tab 50 includes a score channel 52 concentrating stress on the tab 50 along the score channel to encourage breaking of the tab 50 at a line defined by the score channel 52 when tab 50 is deflected upward by a subsequent opening of the lid 12. Unlike the closing of the lid over the base 14 where the stresses at score channel 52 are compressive, opening of lid 12 from base 14 creates a tensile stress at the score line causing a cracking off of tab 50. When tab 50 is within mortise 26, the lower surface of tab 50 is substantially parallel to the abutting wall of mortise 26 and the hinge axis 18 and so that motion of the lid 12 away from base 14 does not produce any force on the sidewalls 56 which would tend to move sidewall 56 outward.

Referring to FIGS. 2, 7, and 8, at the rearmost edge of sidewall 56 of lid 12 are inwardly facing pins 58 which may be received within the sockets 38 in bottom 28 to provide the hinge 16 for hinging the lid 12 about the base 14 along the hinge axis 18. The shaft of pins 58 are not radially symmetric about the hinge axis 18 but have opposed flats providing a narrower diameter 40' as measured along an angle tipped with respect to the top panel 21 of the lid 12.

Specifically, the narrowest diameter of the pins 58 is presented along an insertion axis 60 perpendicular to both the hinge axis 18 and the plane of the bottom panel 30 of the bottom 28 when the lid 12 is open and forms an angle with the base 14 of 15°. This narrowest diameter 40' of pins 58 substantially corresponds to the minimum width 40 of the socket 38 so that the pins 58 may be inserted in the socket 38 along the insertion axis 60 or removed from the socket 38 along the insertion axis 60 only when the lid 12 is opened.

When the lid 12 is closed with the base 14, the pins 58 are no longer able to pass upward along the insertion axis 60 out of the socket 38 as a result of interference between the pins 58 and the walls of the socket 38. Thus, when the CD jewel box 10 is closed, it may not be opened by separation of the hinges 16 along the insertion axis 60.

Referring now to FIG. 9, the pins 58 are terminated at their inward end by a flange 62 having a radius substantially greater than that of the hole of socket 38. This flange 62 prevents the pins 58 from being removed from the socket 38 by motion along the hinge axis 18 which might otherwise serve to disengage pins 58 from socket 38.

Thus, once the lid 12 is first closed over the base 14, it may not be separated without a breaking off of tab 50 which requires a significant force. Further, once the jewel box 10 has been opened, tabs 50 will no longer be in place thus providing a visual indication through the transparent lid 12 that the CD jewel box 10 has been opened once.

Referring again to FIG. 2, sidewall 56 also includes an inward facing protrusion 68 which when lid 12 is closed over bottom 28 snaps into dimple 42 to resist inadvertent opening of the jewel box 10 in casual use. The protrusion 68 may be disengaged from the dimple 42 with much less force than is required to break the tabs 50 and the protrusion 68 and dimple 42 may be repeatedly engaged and disengaged to provide a detent for holding the jewel box 10 closed. Thus, the jewel box 10 as well as serving as a distribution package may serve as a convenience storage tray for a CD by the consumer.

The above description has been that of a preferred embodiment of the present invention. It will occur to those who practice the art that many modifications may be made without departing from the spirit and scope of the invention. To apprise the public of the various embodiments that may fall within the scope of the invention, the following claims are made.

We claim:

1. A storage box for compact disks comprising:
   a base having a recess for receiving the compact disk;
   a lid fitting over the base in a closed position to enclose the compact disk between the base and the lid;
   a hinge joining the base and lid to permit the lid to swing away from the base in an open position providing access to the compact disk;
   a detent operating between the base and lid to retain the lid and base in the closed position against the application of a first opening force; and
   a catch operating between the base and lid to retain the lid and base in the closed position against the application of a second opening force substantially greater than the first opening force.

2. The storage box as claimed in claim 1 wherein the catch is a tab protruding from one of the lid and base to be received in a mortise in the other of the lid and base, wherein the tab is adapted to break off upon the first opening of the lid and base.

3. The storage box as claimed in claim 2 wherein the lid is constructed of a transparent plastic and the base is constructed of a visually contrasting material and wherein the tab is affixed to the base and the mortise is in the lid so that the presence or absence of the tab may be detected visually when the lid and base are in the closed position.

4. The storage box as claimed in claim 1 wherein the hinge includes a pin protruding from one of the lid and base to be received in a socket in the other of the lid and base so that the pin may swivel about a hinge axis in the socket with opening and closing of the lid and base;
   wherein the socket is open on one side to receive and release the pins along an insertion direction perpendicular to the hinge axis; and
   wherein the width of the pins across the hinge axis varies so that the pins may be received and released only when the lid and base are in the open position.

5. The storage box as claimed in claim 1 wherein the hinge includes a pin protruding from one of the lid and base to be received in a socket in the other of the lid and base so that the pin may swivel about a hinge axis in the socket with opening and closing of the lid and base; and
   wherein the pins are terminated by a flange that prevents removal of the pins from the sockets with motion along the hinge axis.

6. The storage box as claimed in claim 1 wherein the base is constructed of two parts that may be separately injection molded, one of which provides the recess for receiving the compact disk.

7. The storage box as claimed in claim 1 wherein the detent is a rounded protrusion in one of the lid and base to be received in a dimple in the other of the lid and base, wherein the protrusion is adapted flex away from the dimple without breaking upon the first opening of the lid and base.

* * * * *